(12) United States Patent
Aziz et al.

(10) Patent No.: US 11,140,112 B1
(45) Date of Patent: Oct. 5, 2021

(54) METHOD OF GENERATING A THREAD FOR DISCUSSION AMONGST A PLURALITY OF PARTICIPANTS IN A GROUP CONVERSATION AND REAL-TIME COMMUNICATION AND COLLABORATION PLATFORM

(71) Applicant: Unify Patente GmbH & Co. KG, Munich (DE)

(72) Inventors: Nibal T. Aziz, Lake Worth, FL (US); Emil Ballan, Boynton Beach, FL (US)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/914,536

(22) Filed: Jun. 29, 2020

(51) Int. Cl.
*H04L 12/58* (2006.01)
*G06F 3/0482* (2013.01)

(52) U.S. Cl.
CPC ............ *H04L 51/16* (2013.01); *G06F 3/0482* (2013.01); *H04L 51/02* (2013.01); *H04L 51/04* (2013.01); *H04L 51/24* (2013.01)

(58) Field of Classification Search
CPC ......... H04L 51/02; H04L 51/04; H04L 51/16; H04L 51/24; G06F 3/0482; G06Q 10/103; G06Q 10/1097
See application file for complete search history.

(56) References Cited

U.S. PATENT DOCUMENTS

| | | | | |
|---|---|---|---|---|
| 7,185,065 B1* | 2/2007 | Holtzman | ............... | G06Q 40/06 709/217 |
| 7,904,515 B2* | 3/2011 | Ambati | .................. | G06Q 10/10 709/205 |
| 8,166,408 B2* | 4/2012 | Castellucci | .......... | G06Q 10/107 715/758 |
| 8,201,095 B2* | 6/2012 | Dewar | ................. | G06Q 10/107 715/759 |
| 10,019,765 B2* | 7/2018 | Himel | .................... | G06Q 50/01 |
| 10,216,709 B2 | 2/2019 | Lane et al. | | |
| 10,218,666 B1* | 2/2019 | Rosenshine | ........ | G06Q 30/0246 |
| 10,523,613 B1* | 12/2019 | Alm | ...................... | G06F 3/0481 |
| 10,530,718 B2* | 1/2020 | Denoue | ............... | G06Q 10/101 |
| 10,778,630 B1* | 9/2020 | Fox | ................... | G06F 16/90332 |
| 10,838,997 B2* | 11/2020 | Liu | ......................... | G06N 5/022 |
| 2002/0062368 A1* | 5/2002 | Holtzman | ............... | G06F 21/31 709/224 |

(Continued)

*Primary Examiner* — Jerry B Dennison
(74) *Attorney, Agent, or Firm* — Buchanan Ingersoll & Rooney PC

(57) ABSTRACT

A method of generating a thread for discussion amongst a plurality of participants in a group conversation via a communication network can be configured so that the thread is adapted to link a plurality of posts. The method can include receiving an initial post from one of the participants that includes items arranged in a bullet list. Each item can represent a topic to be discussed among the participants. Each item can be clickable for a participant by converting each item into a hyperlink. Upon receiving a click on an item from the bullet list made by a participant from the plurality of participants, a sub-thread can be created for the item. A real-time communication and collaboration platform can include a number of clients and a server connected to each other via a communication network that can utilize an embodiment of the method.

15 Claims, 7 Drawing Sheets

Hover text

(56) References Cited

U.S. PATENT DOCUMENTS

| | | | |
|---|---|---|---|
| 2003/0182408 A1* | 9/2003 | Hu | G06F 11/3414 |
| | | | 709/223 |
| 2005/0149621 A1* | 7/2005 | Kirkland | H04L 51/04 |
| | | | 709/207 |
| 2006/0080162 A1* | 4/2006 | Arnett | G06Q 30/0204 |
| | | | 705/7.31 |
| 2007/0244892 A1* | 10/2007 | Narancic | G06F 16/258 |
| 2008/0082607 A1* | 4/2008 | Sastry | G06F 16/986 |
| | | | 709/204 |
| 2012/0185491 A1* | 7/2012 | Mansfield | G06F 16/00 |
| | | | 707/752 |
| 2013/0080427 A1* | 3/2013 | Cross | G06F 16/3326 |
| | | | 707/728 |
| 2014/0310365 A1* | 10/2014 | Sample | H04L 51/16 |
| | | | 709/206 |
| 2016/0269351 A1 | 9/2016 | Talwar et al. | |
| 2017/0019474 A1 | 1/2017 | Tevosyan et al. | |
| 2018/0095940 A1* | 4/2018 | Meixner | H04L 51/16 |
| 2018/0097902 A1* | 4/2018 | Meixner | H04W 4/12 |
| 2018/0152404 A1 | 5/2018 | Coppen et al. | |
| 2020/0403951 A1* | 12/2020 | Kapoor | H04L 51/043 |

* cited by examiner

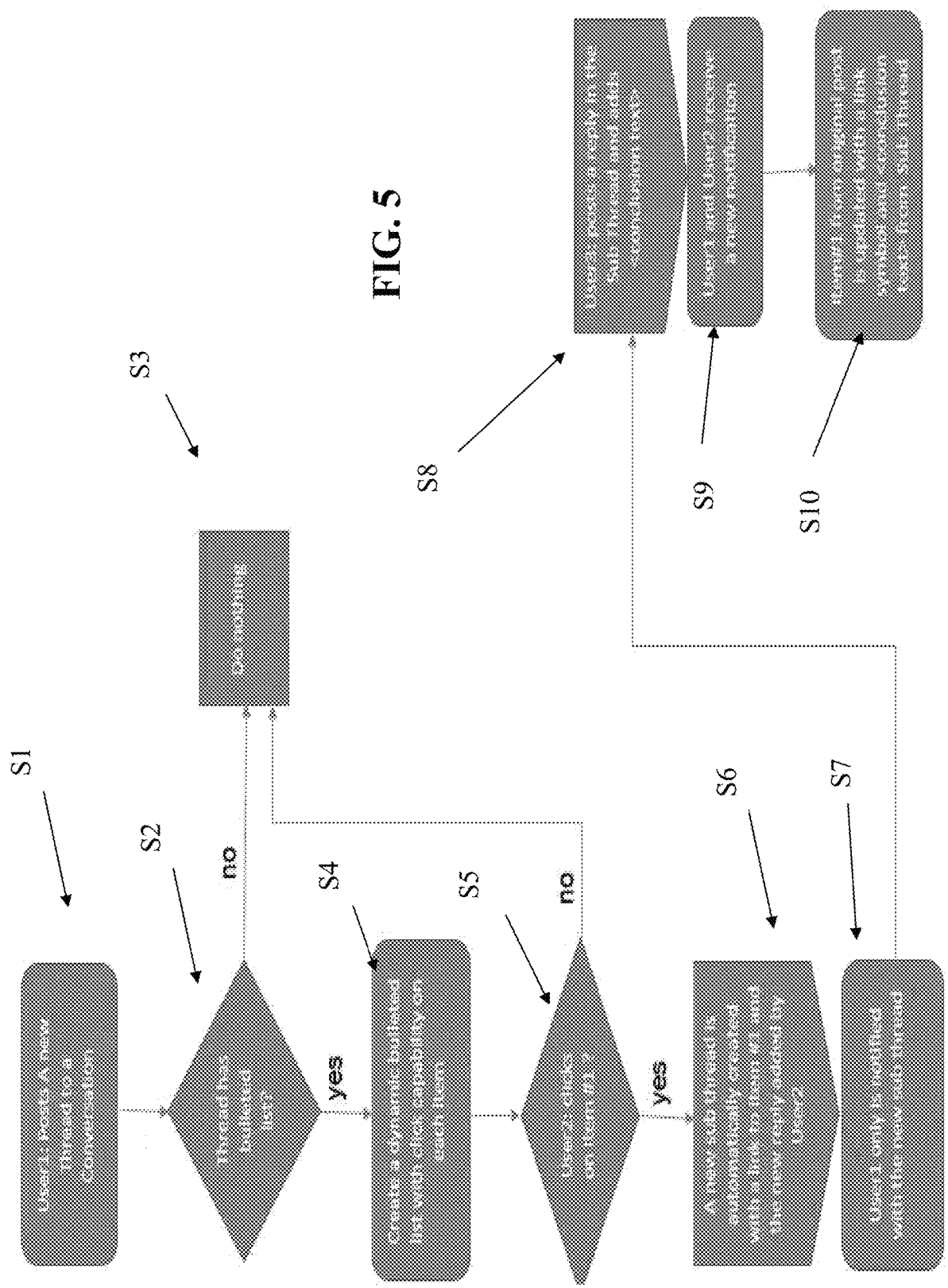

METHOD OF GENERATING A THREAD FOR DISCUSSION AMONGST A PLURALITY OF PARTICIPANTS IN A GROUP CONVERSATION AND REAL-TIME COMMUNICATION AND COLLABORATION PLATFORM

FIELD

The present invention relates to a method of generating a thread for discussion amongst a plurality of participants in a group conversation and to a real-time communication and collaboration platform.

BACKGROUND

Nowadays, electronic messaging and communication via computer terminals or the like is used widespread. Moreover, electronic communication in which a plurality of participants, e.g. a group of participants, is involved in so-called conversation threading is commonly used in e-mail clients, bulletin boards, newsgroups, internet forums, and the like. The messages of participants or groups of participants that are involved in a group conversation are linked in a thread that is displayed at the respective terminal of the participants. However, such a thread may be displayed in various ways.

Usually, in prior art, an original message is automatically included in a reply; but also threads of messages may be arranged in lists or may be arranged in a hierarchical or nested way, wherein messages close to their replies are displayed in a tree. Otherwise, they also may be displayed in a linear or flat arrangement so as to display the messages in chronological order. Thus, there exists a variety of display options for displaying messages that are somehow linked to each other.

However, due to the large volume of mails and messages, for a participant, it may become difficult to process, analyze, evaluate, synthesize, and integrate important information when viewing these large lists or trees of messages. During a chat conversation, the list of replies may become very large. Thus, a participant may lose the overview, and in particular, may lose track of the original reference in each reply, for example, if a person presents a list of bulleted items and needs a response from either an individual or multiple individuals.

SUMMARY

We have determined that, currently, replies are created as new entries into a chat topic, and an individual may cross reference a specific bullet from the original bullet list. For example, reply #1 may add a reference sentence to bullet #1 and reply #2 adds a reference sentence to bullet #4, etc. As the list of replies expands on a particular chat topic, the flow or sequence of questions/answers/comments to the different references of the original list of bullets may be easily lost as a result of multiple reply entries. Thus, the overall transparency of the chat conversation degrades as the number of entries increases.

Therefore, there exists a problem of providing participants of a group conversation with a more user-friendly and more clear and concise arrangement for commenting and discussing topics or items in a bullet or numbered list of a post without losing its context.

This problem can be solved by embodiments of the inventive method of generating a thread for discussion amongst a plurality of participants in a group conversation and embodiments of a communication and collaboration platform.

According to embodiments of the present invention, a method of generating a thread for discussion amongst a plurality of participants in a group conversation via a communication network, the thread being adapted to link a plurality of posts,
- receiving a initial post from one of the participants, the initial post comprising a plurality of items arranged in a bullet list, each item representing a topic to be discussed among the participants,
- making each item clickable for a participant by converting each item into a hyperlink,
- upon receiving a click on an item from the bullet list made by a participant from the plurality of participants, creating a sub-thread for the item.

Therefore, according to embodiments of the inventive method, a user or participant of the group conversation will not lose the context in a discussion with various side discussions on a plurality of topics or items. According to threaded messages known from prior art, every thread must be attached to a conversation message and each message only supports one thread so that users are only able to reply to the entire message. With the inventive feature of automatically creating sub-threads, multiple threads, namely, the sub-threads may be created from one message, wherein each sub-thread is linked to a specific item of the original or initial post of a thread. Thus, the inventive arrangement of threaded messages will enable the participants of the group conversation to have a better overview and to easily navigate through the entire conversation, even if there is a multitude of side discussions.

According to a preferred embodiment of the invention, the sub-thread includes a title of the initial post, and the text of the item.

According to another preferred embodiment of the invention, the method further comprises a step of identifying the sub-thread created by the click with a soft link symbol that also is clickable for the participant so as to return to the initial post.

According to still another preferred embodiment of the invention, the sub-thread is visible for all participants from the plurality of participants.

According to still another preferred embodiment of the invention, the method further comprises a step of generating a new message notification, the new message notification being displayed only for the participant who made the initial post.

Further, the sub-thread may be provided with an option for the participants from the plurality of participants to post a reply or comment in the sub-thread.

Preferably, the method further comprises a step of detecting, if a text enclosed in a first predefined symbol at the beginning and a second predefined symbol at the end of the text is present in the reply or comment to the sub-thread, and identifying the text enclosed by the first and second predefined symbols as a conclusion statement for the sub-thread.

According to another preferred embodiment of the invention, the first predefined symbol is an open angle bracket, and the second predefined symbol is a closed angle bracket.

According to still another preferred embodiment of the invention, the method further comprises a step of linking the conclusion text to the initial post. In particular, the conclusion text and the hyperlink to the sub-thread or side conversation is added to the item that has been clicked and for which the sub-thread has been opened, so that the other participants of the group conversation are informed and may review the details of the side conversation comprised in the sub-thread.

Moreover, according to the present invention, a real-time communication and collaboration platform comprising a plurality of clients and a server connected to each other via a communication network is provided, wherein the server is adapted to carry out the method of generating a thread for discussion amongst a plurality of participants in a group conversation via a communication network. The clients can be user devices or applications run on the user devices that are communicatively connected to the server via at least one communication connection.

The server can be a computer device that hosts a service for the real-time communication and collaboration in which the generation of threads can be provided via user interfaces generated on the displays of user devices when those user devices are communicatively connected to the server for use of the service. Input provided via the user interfaces (e.g. pointer devices, touch screen displays, keyboards, etc.) can be communicated from the user device to the server via their communication connection. The server can provide data to the user devices so updates to the displayed user interfaces can then be generated in response to the provided input for the display of the threads and sub-threads that can be generated via embodiments of the method.

The real-time communication and collaboration platform may further be adapted to support real-time audio and/or video conferences.

Other details, objects, and advantages of the invention will become apparent as the following description of certain exemplary embodiments thereof and certain exemplary methods of practicing the same proceeds.

BRIEF DESCRIPTION OF THE DRAWINGS

The invention and embodiments thereof will be described below in further detail in connection with the drawings.

FIG. 5 shows a flow chart illustrating the steps of a method of dynamically creating a thread in group conversation replies according to an embodiment of the invention.

Figure 1:
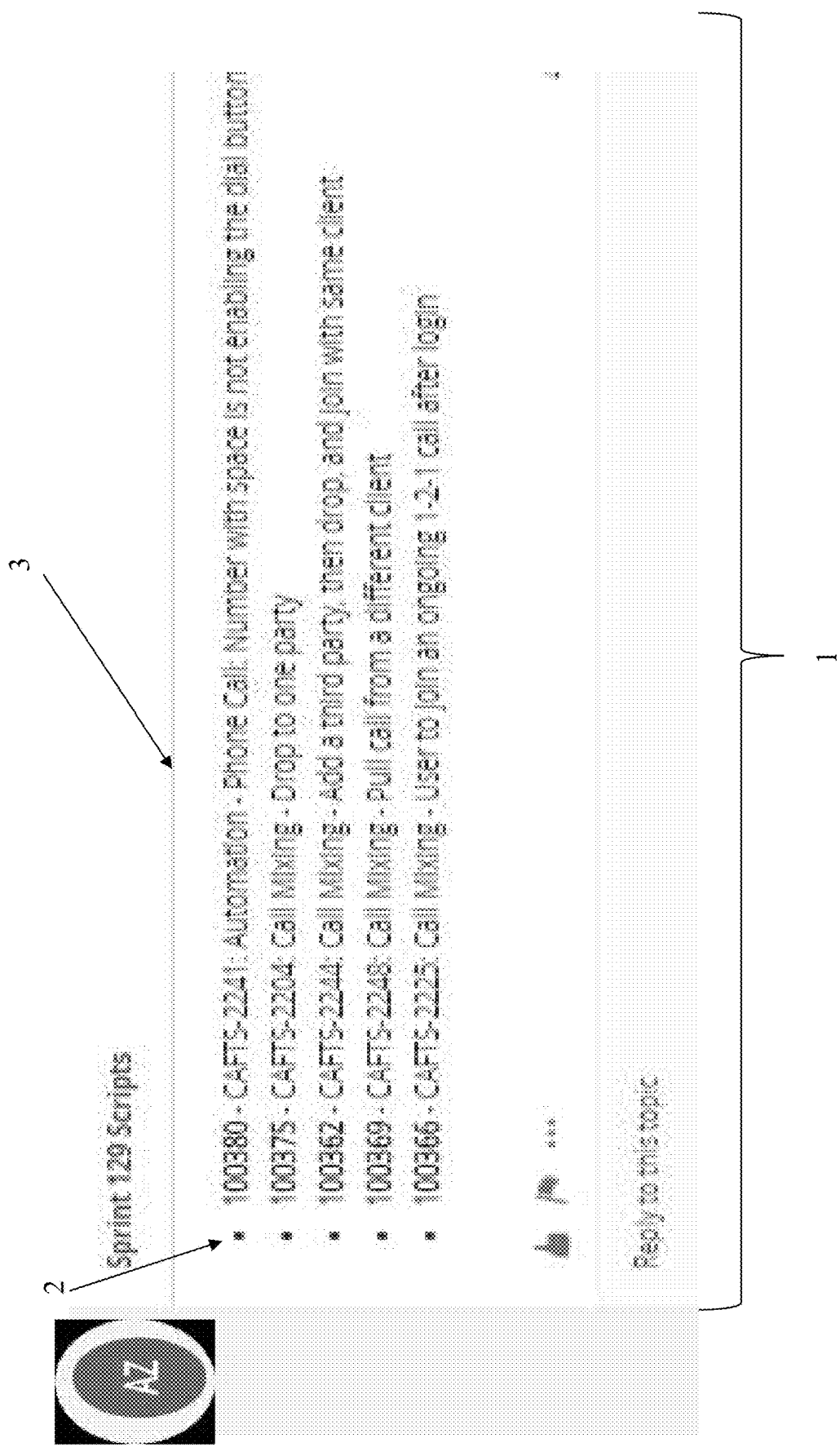
FIG. 1 shows an original thread with a list of items according to an embodiment of the invention.

Reference numerals used in the drawings include:
1 original thread
2 list
3 items
4 click icon
5 sub-thread
6 notification
7 hyperlink symbol
8, 8' angle brackets
9 conclusion text

DETAILED DESCRIPTION

FIG. 1 shows an original thread 1 with a list 2 of items 3 according to an embodiment of the invention. This thread can be displayed on a display device of a user terminal device that is communicatively connected to a server that hosts a communication service that supports the text communication between users that can be provided via the thread 1 (e.g. a communication platform). In the exemplary scenario illustrated here, a participant has started a thread 1 which here is referred to the original thread 1 with a list 2 of bulleted or numbered items 3, wherein every item 3 of the list 2 of the post has a click functionality (e.g. a user can actuate an action via a click, which can be provided via a "clicking" a mouse button, use of a touch screen display to tap the item to "click" it via a finger or stylus, etc.).

Another participant of the conversation may now reply to the message or post and may dynamically create a new thread for a particular item 3 of the list 2, simply by clicking on this item 3. The new thread that can be generated can be considered a sub-thread of the selected item 3 (e.g. the item that is clicked on to generate the new thread).

It should be appreciated that the user interface providing the thread 1 with the list 2 of items 3 can be generated on a display of a terminal device that is communicatively connected to a server that may host a communication service. An application that is stored on the non-transitory memory of the terminal device may be run by a processor of the user's terminal device to facilitate a communicative connection to the server for display of this interface. The server that hosts the service may provide data to the terminal device in conjunction with the application run on the terminal device to facilitate generation of the user interface, receipt of input from the user via that user interface, and providing of output in response to this input via the user interface.

It should be appreciated that the server and each user's terminal device can be an electronic device that includes hardware (e.g. a processor connected to non-transitory memory, at least one interface for a communication connection) and can include or be connected to input devices and output devices (e.g. a keyboard, a pointer device, a touch screen display, etc.). The user terminal device can be communicatively connected to a server via a network connection (e.g. internet connection, local area network connection, etc.). A router or other type of access point as well as other network elements can be utilized to facilitate the communication connection between a user device and the server that hosts the service. Each user of a conversation can have at least one user device that the user utilizes to view of the list 2 and provide input and also receive output related to communications involving the list 2 via the displayed user interface and use of at least one input device when the user device is communicatively connected to the server for use of the communication service.

Figure 2:
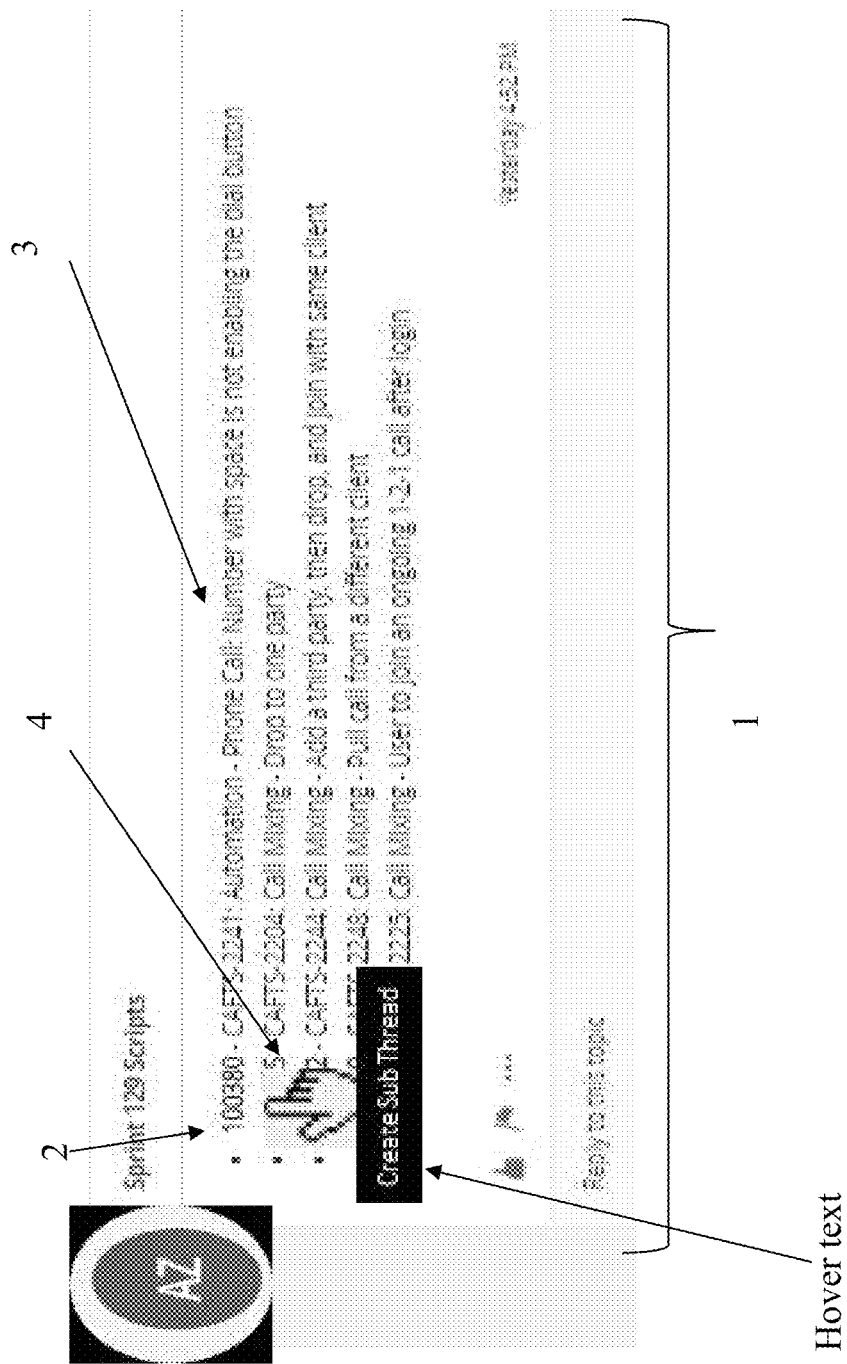
FIG. 2 shows the original thread shown in FIG. 1 according to an embodiment of the invention.

FIG. 2 again shows the original thread 1 of FIG. 1. As can be seen here, a participant (not shown) clicks on an item 3 included in the list, as indicated by the click icon 4. the click icon 4 can be generated in response to detecting that a pointer of the user is hovering over a particular item 3 in some embodiments. Upon such a detection, the click icon 4 can be generated as a clickable hover icon over the item. In other embodiments, the click icon can be generated in response to clicking on the item 3 and also the instruction associated with the clicking action can be displayed to the participant, namely, "create a sub thread". In other embodiments, the click icon 4 may not be generated and a selection of an item via clicking may be configured so that such a selection provided via a click results in formation of a sub-thread.

Figure 3A:
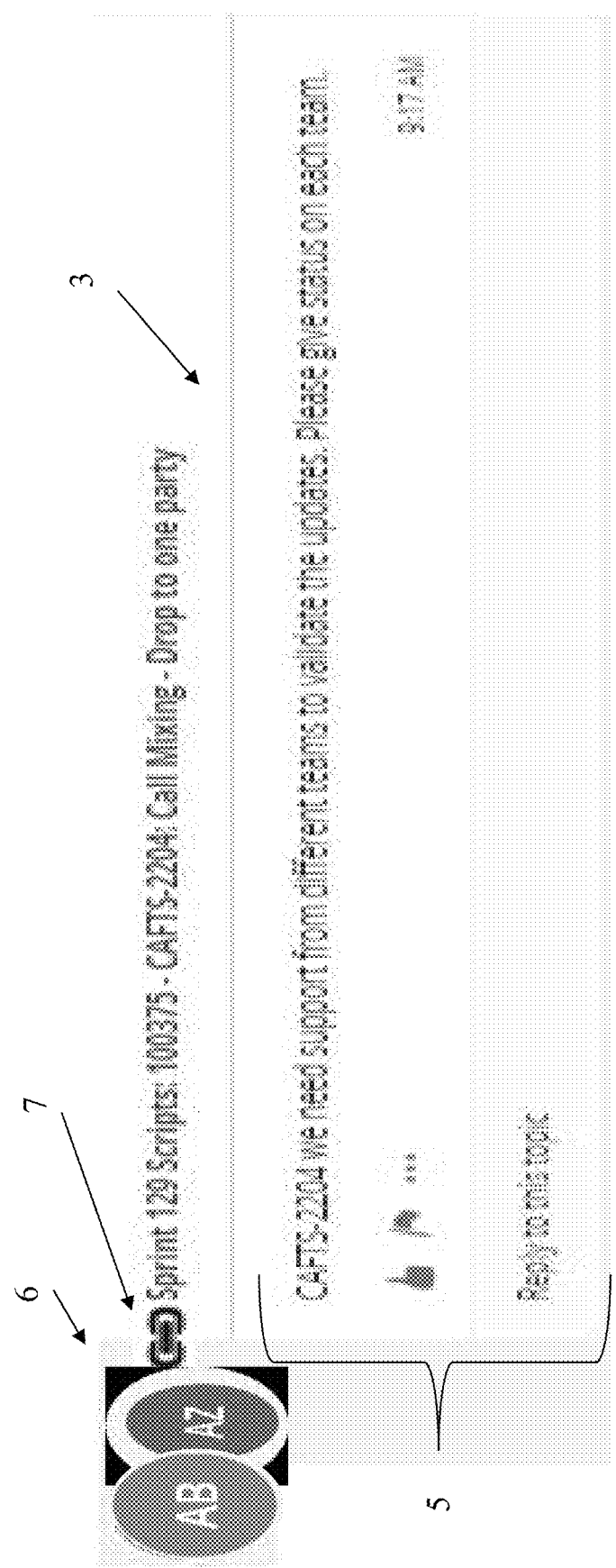
FIG. 3A, FIG. 3B, FIG. 3C respectively show how a sub-thread is created in the original thread shown in FIG. 1 according to an embodiment of the invention.
Figure 3B:
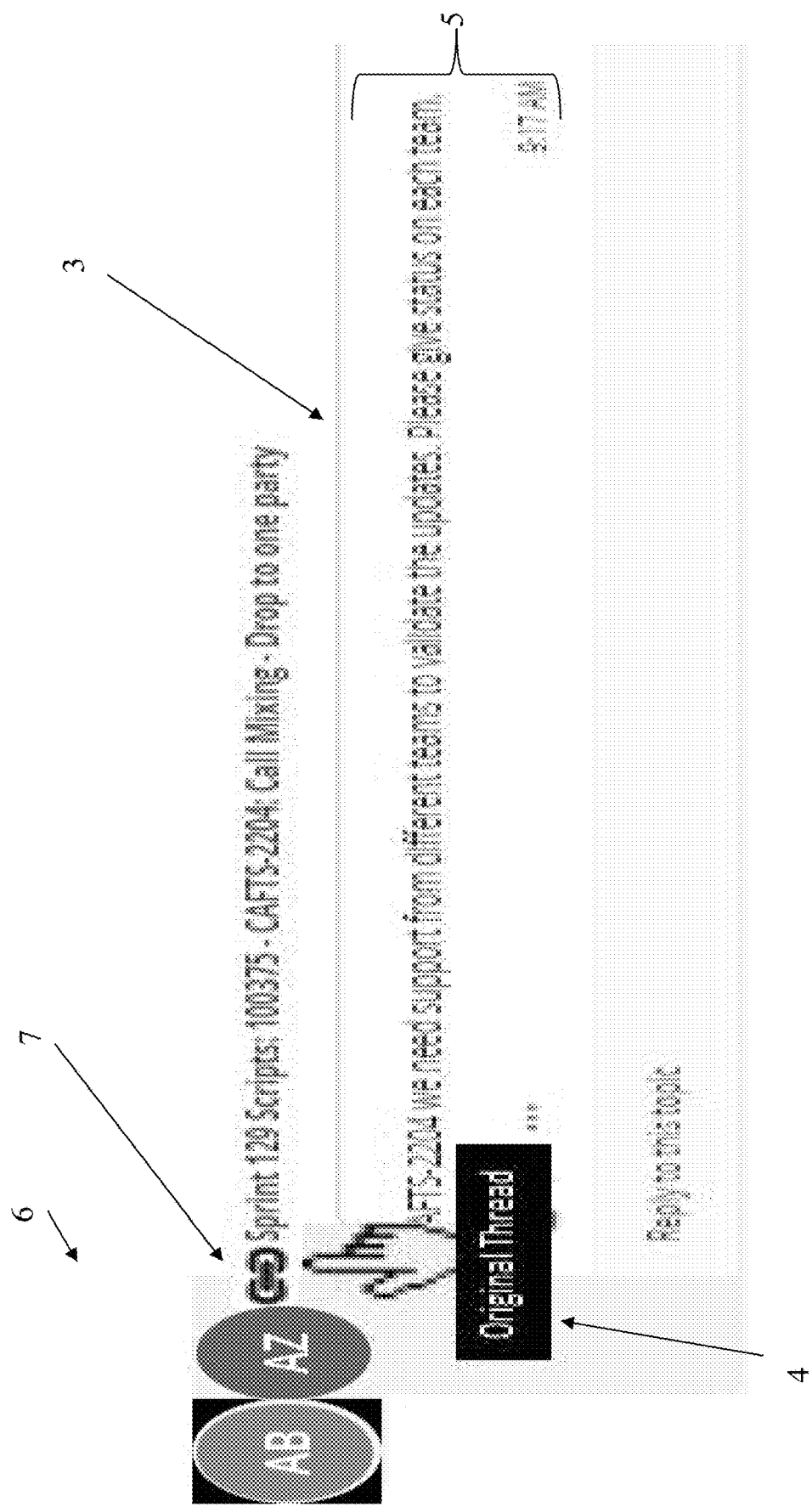
Figure 3C:
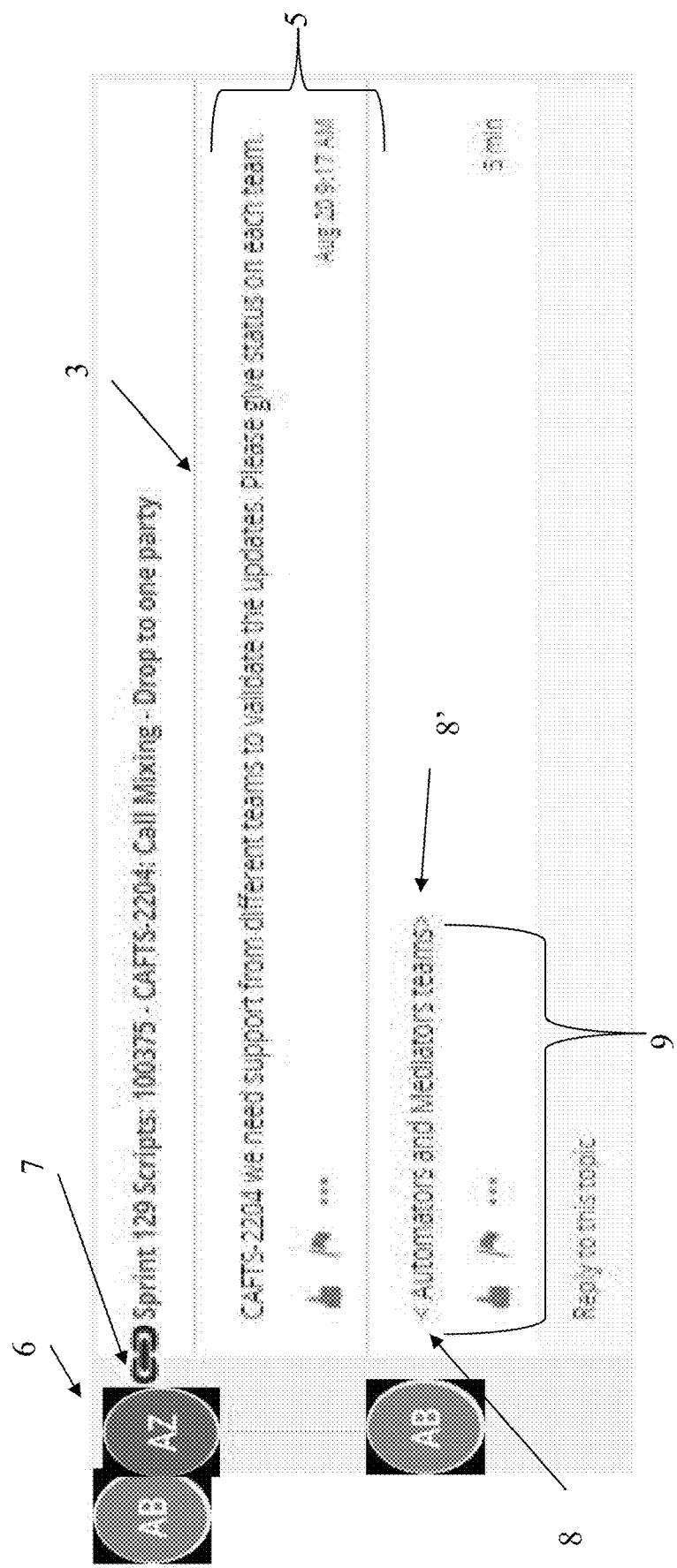

FIG. 3A, FIG. 3B, and FIG. 3C respectively show, how an exemplary process of how a sub-thread 5 can be created in the original thread 1 shown in FIG. 1. As explained with respect to FIG. 2, the sub-thread 5 can created upon clicking on an item 3 included in list 2 of the original thread 1 or clicking of the click icon 4 that can be generated to facilitate sub-thread formation. The new sub-thread 5 will enable, for example, side conversations to the original or initial post, and has the following characteristics, as explained in the following with respect to FIG. 3A, FIG. 3B, and FIG. 3C:

In FIG. 3A, it can be seen that the new sub-thread 5 is created and displayed to the participant with a new message notification 6. However, the first message notification 6 will only be displayed to the participant from whom the post originated. Nevertheless, other users or participants in the conversation may see this new sub-thread 5, but the new message notifications are limited to the participant(s) or user(s) who add a comment or a reply to the sub-thread 5.

In FIG. 3B, a hyperlink symbol 7 is illustrated on the user interface. The hyperlink symbol 7 can be generated in response to formation of the new sub-thread 5 so that this symbol is generated and displayed when the new sub-thread is generated and displayed. Clicking on the hyperlink symbol 7 will interactively link back to the original post so that the user interface is updated to illustrate the original thread 1 with a modification related to the new sub-thread that was generated.

In FIG. 3C, a feature providing a possibility for a participant to add so-called conclusion text 9 between two symbols, namely, the angle brackets "<" indicated by reference numeral 8 and ">" indicated by reference numeral 8' is illustrated. If these symbols 8, 8' are found in a reply or in a comment of the sub-thread 5, then the text between the two symbols 8, 8' is considered and treated as a conclusion statement or conclusion text 9. This conclusion text 9 is returned to the original thread 1 for updating the display of the original thread 1 of the user interface (see FIG. 4), in response to the interactive link symbol 7 (see FIG. 3B) being clicked by a participant (e.g. via a pointer device click or a touch screen display input provided by a finger or stylus).

Figure 4:
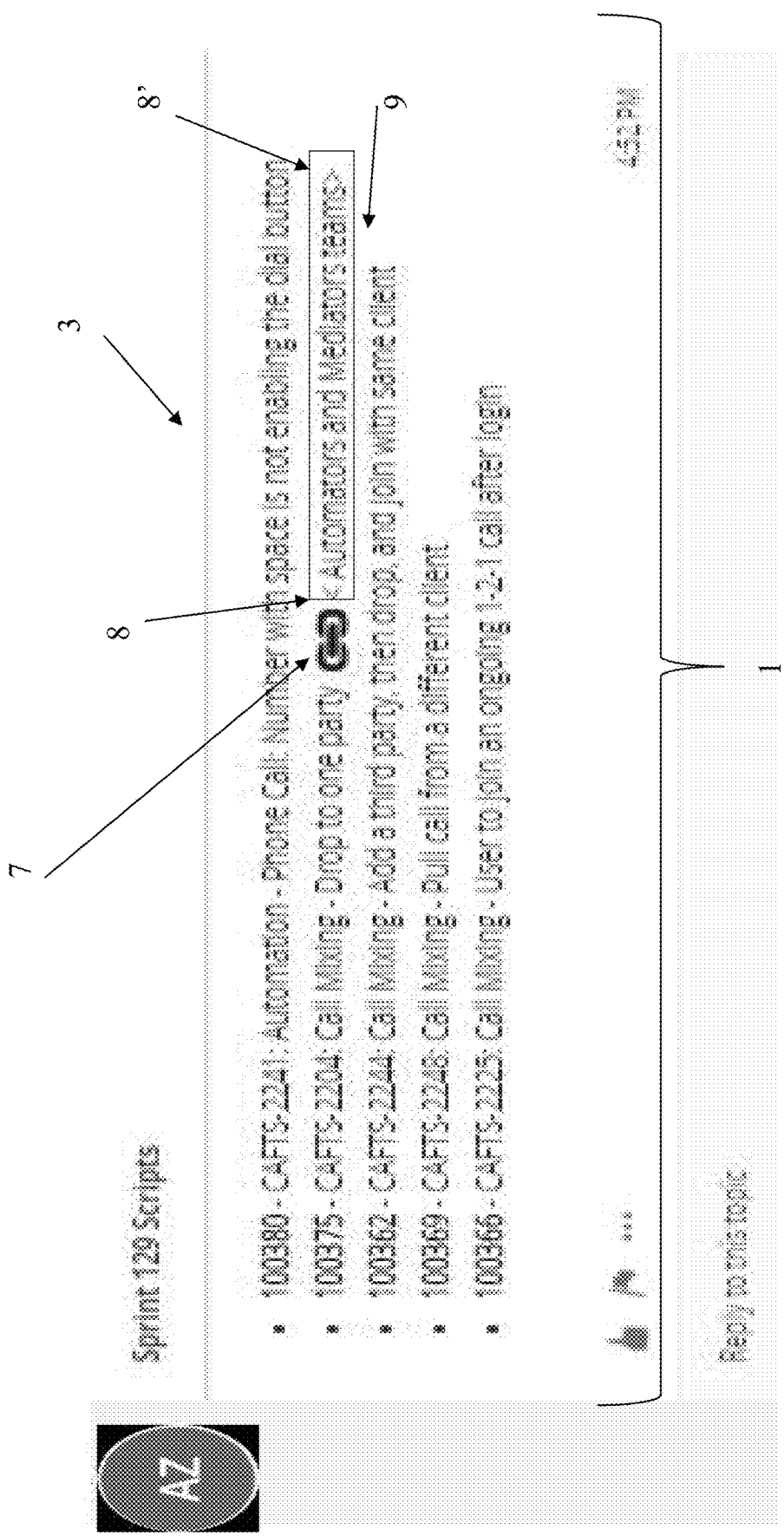
FIG. 4 shows the original thread of FIG. 1 after being modified according to an embodiment of the invention.

FIG. 4 shows the original thread 1 of FIG. 1 after being modified according to an embodiment of the invention shown in FIGS. 3A-3C. As can be seen here, the original thread 1 is modified with a link symbol 7 and a conclusion text 9 enclosed in the two angle brackets 8, 8'.

FIG. 5 shows a flow chart illustrating steps of an embodiment of a method of dynamically creating a thread in group conversation replies according to an embodiment of the invention. In step S1, a first participant (user 1) in a group conversation posts a new thread in this conversation. Then, in step S2, it is verified whether the new thread has a bulleted list (list 2, see FIG. 1). If the result is negative, then nothing is done (step S3). If the result is positive, then in a subsequent step S4, a dynamic bulleted list is created with click capability on each item (item 3, see FIG. 1) for display on user interfaces of users via the server hosting the service. In the following step S5, it is verified, if a second participant (user 2) of the group conversation clicks on an item of the list, for example, #1. If the second participant does not click on an item, then again, nothing is done (step S3). If, however, the second participant clicks on an item, then a new sub-thread (sub-thread 5, FIG. 3A, 3B, 3C) is automatically created with a link 7 to the item #1, and the new reply added by the second participant (user 2). In step S7, the first participant (user 1) is notified about the new sub-thread 5, and subsequently, in step S8, a third participant (user 3) of the group conversation posts a reply in the sub-thread 5 and adds a conclusion text (conclusion text 9, see FIG. 3C). Then, in step S9, the first participant (user 1) and the second participant (user 2) receive a new notification, whereupon, in step S10, item #1 of the original post for which the sub-thread 5 has been created and updated with link symbols in the displayed user interface for the users (see FIG. 4; i.e. hyperlink symbol 7, two angle brackets 8 8', and the conclusion text 9 from the sub-thread).

While certain exemplary embodiments of apparatuses, networks, communication platforms, and communication systems and methods of making and using the same have been discussed and illustrated herein, it is to be distinctly understood that the invention is not limited thereto but may be otherwise variously embodied and practiced within the scope of the following claims.

What is claimed is:

1. A method of generating a thread for discussion amongst a plurality of participants in a group conversation via a communication network, the thread being adapted to a plurality of posts, the method comprising:
   receiving an initial post from one of the plurality of participants, the initial post comprising a plurality of items arranged in a bullet list, each item representing a topic to be discussed among the participants,
   making each item clickable by any of the plurality of participants by associating hyperlinks for the plurality of items arranged in the bullet list so each item is associated with its own hyperlink,
   upon receiving a click on an item from the bullet list made by a participant from the plurality of participants, creating a sub-thread for the item, and
   detecting that a text enclosed in a first predefined symbol at a beginning of the text and a second predefined symbol at an end of the text is present in a reply or a comment to the sub-thread so the text enclosed by the first and second predefined symbols is identifiable as a conclusion text for the sub-thread for updating a display of the bullet list.

2. The method of claim 1, wherein the sub-thread includes a title of the initial post, and a text related to the item.

3. The method of claim 1, wherein the method further comprises a step of identifying the sub-thread created by the click with a soft link symbol that also is clickable for the participant from the plurality of participants so as to return to the initial post.

4. The method of claim 1, wherein the sub-thread is visible for all participants from the plurality of participants.

5. The method of claim 1, wherein the method further comprises a step of generating a new message notification, the new message notification being displayed only for the participant who made the initial post.

6. The method of claim 1, wherein the sub-thread is provided with an option for any of the plurality of participants to post a reply or comment in the sub-thread.

7. A method of generating a thread for discussion amongst a plurality of participants in a group conversation via a communication network, the thread being adapted to a plurality of posts, the method comprising:
   receiving an initial post from one of the plurality of participants, the initial post comprising a plurality of items arranged in a bullet list, each item representing a topic to be discussed among the participants,
   making each item clickable by any of the plurality of participants by associating hyperlinks for the plurality of items arranged in the bullet list so each item is associated with its own hyperlink,
   upon receiving a click on an item from the bullet list made by a participant from the plurality of participants, creating a sub-thread for the item, wherein the sub-thread is provided with an option for any of the plurality of participants to post a reply or comment in the sub-thread, detecting, if a text enclosed in a first predefined symbol at the beginning and a second predefined symbol at the end of the text is present in the reply or comment to the sub-thread, and identifying the text enclosed by the first and second predefined symbols as a conclusion statement for the sub-thread.

8. The method of claim 7, wherein the first predefined symbol is an open angle bracket, and the second predefined symbol is a closed angle bracket.

9. The method of claim 7, wherein the method further comprises a step of linking the conclusion text to the initial post.

10. A real-time communication and collaboration platform comprising a plurality of clients and a server connected to each other via a communication network, wherein the server is adapted to carry out the method according to claim 7.

11. A method of generating a thread for discussion amongst a plurality of participants in a group conversation via a communication network, the thread being adapted to a plurality of posts, the method comprising:

a server receiving an initial post, the initial post comprising a plurality of items arranged in a bullet list, each item representing a topic to be discussed among the participants, the server making each item clickable for any of the plurality of participants by associating hyperlinks for the plurality of items arranged in the bullet list so each item is associated with its own hyperlink so that each item is clickable via a user interface that displays the bullet list, upon receiving click input on a displayed item from the bullet list provided via the user interface displayed via communications with the server, the server creating a sub-thread for the item, and detecting input for including text enclosed in a first predefined symbol preceeding the text and a second predefined symbol at an end of the text in a reply or comment to the sub-thread, and identifying the text enclosed by the first and second predefined symbols as a conclusion statement for the sub-thread.

12. The method of claim 11, wherein the user interface is displayed on a display of a user terminal device of a participant from the plurality of participants when the user terminal device is communicatively connected to the server.

13. The method of claim 11, wherein the first predefined symbol is an open angle bracket, and the second predefined symbol is a closed angle bracket.

14. The method of claim 13, comprising:

updating the sub-thread so that the bulleted list includes the sub-thread with the conclusion statement such that the conclusion statement is displayed in the bullet list when the bulleted list is displayed via the user interface.

15. The method of claim 11, comprising:

updating the sub-thread so that the bulleted list includes the sub-thread with the conclusion statement such that the conclusion statement is displayed in the bullet list when the bulleted list is displayed via the user interface.

* * * * *